(12) United States Patent
Xu et al.

(10) Patent No.: US 11,394,022 B2
(45) Date of Patent: Jul. 19, 2022

(54) ELECTROACTIVE MATERIALS FOR SECONDARY BATTERIES

(71) Applicant: UChicago Argonne, LLC, Chicago, IL (US)

(72) Inventors: Guiliang Xu, Naperville, IL (US); Xiang Liu, Darien, IL (US); Khalil Amine, Oakbrook, IL (US)

(73) Assignee: UChicago Argonne, LLC, Chicago, IL (US)

( * ) Notice: Subject to any disclaimer, the term of this patent is extended or adjusted under 35 U.S.C. 154(b) by 271 days.

(21) Appl. No.: 16/844,485

(22) Filed: Apr. 9, 2020

(65) Prior Publication Data

US 2021/0320292 A1 Oct. 14, 2021

(51) Int. Cl.

| | | |
|---|---|---|
| *H01M 4/00* | (2006.01) |
| *H01M 4/36* | (2006.01) |
| *H01M 4/62* | (2006.01) |
| *H01M 4/587* | (2010.01) |
| *H01M 10/0525* | (2010.01) |
| *H01M 10/054* | (2010.01) |
| *H01M 10/0569* | (2010.01) |
| *H01M 50/46* | (2021.01) |
| *H01M 4/02* | (2006.01) |

(52) U.S. Cl.
CPC .......... *H01M 4/364* (2013.01); *H01M 4/587* (2013.01); *H01M 4/623* (2013.01); *H01M 10/054* (2013.01); *H01M 10/0525* (2013.01); *H01M 10/0569* (2013.01); *H01M 50/46* (2021.01); *H01M 2004/021* (2013.01); *H01M 2300/0028* (2013.01)

(58) Field of Classification Search
CPC ........ H01M 4/364; H01M 4/38; H01M 4/623; H01M 10/0525; H01M 4/5805; H01M 10/0569
See application file for complete search history.

(56) References Cited

U.S. PATENT DOCUMENTS

2017/0214035 A1\* 7/2017 Xu .................. H01M 4/043
2018/0151916 A1\* 5/2018 Howlett ................. H01G 11/30

\* cited by examiner

*Primary Examiner* — Cynthia H Kelly
*Assistant Examiner* — Monique M Wills
(74) *Attorney, Agent, or Firm* — Foley & Lardner LLP

(57) ABSTRACT

A $[P_xSb_yM_z]_p/[carbon]_q$ composite where x, y, and z represent atomic percentage values and are x>0; y>0; and z≥0, M is an electrically conductive metal, p and q represent the weight percentage values of the composite wherein p and q are in the range of 0-100%, and is p>0.

18 Claims, 15 Drawing Sheets

Carbon matrix

Nanocrystalline or amorphous metal phosphides

Nanocrystalline or amorphous M

Nanocrystalline or amorphous Sb

Amorphous phosphorus

ELECTROACTIVE MATERIALS FOR SECONDARY BATTERIES

GOVERNMENT RIGHTS

This invention was made with government support under Contract No. DE-AC02-06CH11357 awarded by the United States Department of Energy to UChicago Argonne, LLC, operator of Argonne National Laboratory. The government has certain rights in the invention.

FIELD

The present technology is generally related to electroactive materials and batteries containing such electroactive materials exhibiting superior cycle stability, less volume expansion, and high specific capacity, and methods to prepare the electroactive materials and batteries containing the same.

BACKGROUND

Since the first commercialization by Sony Corporation in the early 1990s, lithium-ion batteries have become the main power source for the portable electronics markets and are now showing great potential use for in the automobile market. However, due to the limited abundance of lithium, it is not enough to meet the increasing demands for large-scale applications, e.g. grid scale stationary energy storage. Moreover, the lithium resources are non-uniformly distributed in the world (about 40% are in South America) and are mainly monopolized by four companies, which will lead to sustained price increases in the near future. Sodium-ion batteries are considered as a potential alternative to lithium ion batteries due to the greater abundance and lower cost of sodium. Moreover, both lithium and sodium are alkali metals and they share similar physical and chemical properties.

With regard to cathodes for sodium ion batteries, layered $NaNi_{1/3}Co_{1/3}Mn_{1/3}O_2$, spinel $NaMn_2O_4$, olivine $NaFePO_4$, $NaFeSO_4F$, and their analogues have been already been reported and were found to have similar electrochemical behaviors relative to their lithium-based cathode material counterparts in terms of specific capacity, cycle life and rate capability, with the exception of lower working voltage.

Anodes for sodium ion batteries, however, have other challenges due to the larger ionic radius of $Na^+$ (1.02 Å) compared to $Li^+$ (0.67 Å). Graphite, the anode material of choice in state-of-the-art lithium ion batteries, can only store a small amount of sodium due to the insufficient interlayer distances and stretched C—C bonds induced by sodiation. This leads to thermodynamic instability in Na-graphite intercalation compounds. Meanwhile, silicon, has been shown to be a promising high energy density anode for the next generation lithium ion batteries. Unfortunately, it is of limited use in sodium ion batteries due to the high diffusion barrier for Na ions in Si lattices. Hard carbon, the most deployed anode materials for industrial application, has a reversible capacity of less than 300 mAh/g. Moreover, the low working voltage (close to 0 V vs. $Na/Na^+$) may trigger sodium dendrite growth, posing severe safety risks, particularly under high temperature and high rate cycling conditions.

SUMMARY

In one aspect, a $[P_xSb_yM_z]_p/[carbon]_q$ composite is provided wherein x, y, and z represent atomic percentage values and are x>0; y>0; and z≥0; M is an electrically conductive metal; and p and q represent the weight percentage values of the composite wherein p and q are in the range of 0-100%. In some embodiments, p and q represent the weight percentage values of the composite with p+q=100 wt % and where is p>0 and 0≤q<100. In some embodiments, M includes at least one of tin, germanium, silicon, lead, arsenic, selenium, bismuth, aluminum, nickel, manganese, molybdenum, niobium, tungsten, tantalum, iron, copper, titanium, vanadium, chromium, nickel, cobalt, zirconium, or yttrium.

In another aspect, an anode active material is provided that include the $[P_xSb_yM_z]_p/[carbon]_q$ composite.

In another aspect, an electrochemical device is provided including a cathode that includes a cathode active material, and an anode that includes any of the anode active materials described herein. The electrochemical device may be a sodium ion battery, according to various embodiments.

In another aspect, a method of preparing a $[P_xSb_yM_z]_p/[carbon]_q$ composite is provided, where the method includes ball milling a mixture of P, Sb, M, and a conductive carbon a ratio to form the $[P_xSb_yM_z]_p/[carbon]_q$ composite; and recovering the $[P_xSb_yM_z]_p/[carbon]_q$ composite; wherein x, y, and z represent atomic percentage values and are x>0; y>0; and z≥0; M is an electrically conductive metal; and p and q represent the weight percentage values of the composite wherein p and q are in the range of 0-100%. In some embodiments, p and q represent the weight percentage values of the composite with p+q=100 wt % and where is p>0 and 0≤q<100.

DETAILED DESCRIPTION

Figure 1:
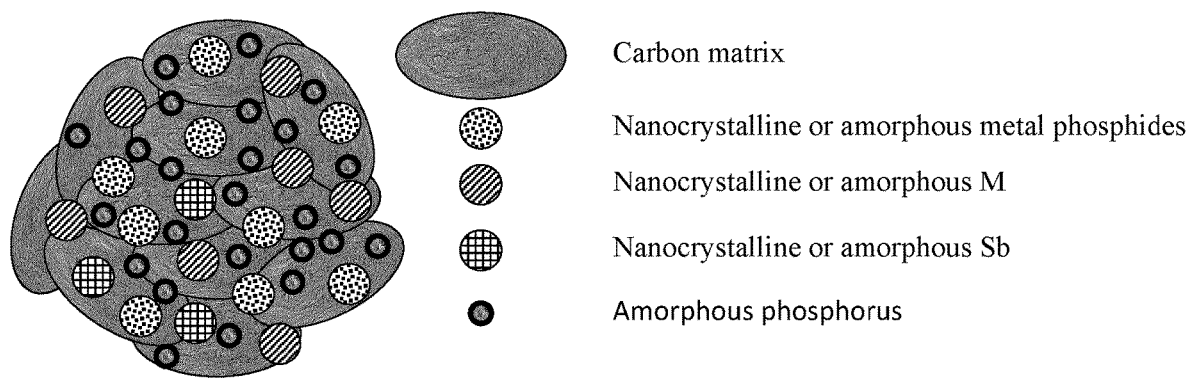
FIG. 1 is a representative general structure of a $[P_xSb_yM_z]_p/[carbon]_q$, according to various embodiments.

Various embodiments are described hereinafter. It should be noted that the specific embodiments are not intended as an exhaustive description or as a limitation to the broader aspects discussed herein. One aspect described in conjunction with a particular embodiment is not necessarily limited to that embodiment and can be practiced with any other embodiment(s).

As used herein, "about" will be understood by persons of ordinary skill in the art and will vary to some extent depending upon the context in which it is used. If there are uses of the term which are not clear to persons of ordinary skill in the art, given the context in which it is used, "about" will mean up to plus or minus 10% of the particular term.

The use of the terms "a" and "an" and "the" and similar referents in the context of describing the elements (especially in the context of the following claims) are to be construed to cover both the singular and the plural, unless otherwise indicated herein or clearly contradicted by context. Recitation of ranges of values herein are merely intended to serve as a shorthand method of referring individually to each separate value falling within the range, unless otherwise indicated herein, and each separate value is incorporated into the specification as if it were individually recited herein. All methods described herein can be performed in any suitable order unless otherwise indicated herein or otherwise clearly contradicted by context. The use of any and all examples, or exemplary language (e.g., "such as") provided herein, is intended merely to better illuminate the embodiments and does not pose a limitation on the scope of the claims unless otherwise stated. No language in the specification should be construed as indicating any non-claimed element as essential.

It has been surprisingly found that the electroactive materials having a formula $[P_xSb_yM_z]_p/[carbon]_q$, are composite materials that have the capacity to accommodate large ions, such as sodium and others, without degradation. The composites are a mixture of amorphous phase material and nanocrystalline phase material. It has been bound that the amorphous phase is primarily due to the phosphorus content, while the nanocrystalline phase is primarily due to the Sb and M phases. The composites have been found to simultaneously accommodate the volume changes during charge/discharge to achieve high specific capacities and stable cycle life and superior rate capability. The high specific capacities and stable cycle life may be attributed to the amorphous phosphorus phase, while the rate capability is attributed to the nanocrystalline Sb and M phases.

The amorphous nature of phosphorus may be characterized by the absence of sharp peaks in the X-ray diffraction pattern. The nanocrystalline phases typically have a maximum dimension of about 5 nm to 50 nm. Moreover, when these electroactive composites are used in anodes for batteries, the different working potential can make the other metals (e.g. Sb and M) as a volume change buffer matrix when one of the materials (e.g. P) undergo charge/discharge, further improving the cycle stability.

In one aspect, provided herein is an electroactive material that is a phosphorus (P), antimony (Sb), and metal (M) composite with carbon. The composite may generally be described by the formula: $[P_xSb_yM_z]_p/[carbon]_q$, where x, y and z represents atomic percentage values and are x>0, y>0, and z≥0. In some embodiments, x>3 and y>0.53. In the composite formula, M is an electrically conductive metal. Illustrative examples of M include, but are not limited to, tin, germanium, silicon, lead, arsenic, selenium, bismuth, aluminum, nickel, manganese, molybdenum, niobium, tungsten, tantalum, iron, copper, titanium, vanadium, chromium, nickel, cobalt, zirconium, yttrium, and combinations or any two or more thereof. In some embodiments, M is one or more of tin, germanium, lead, arsenic, selenium, and bismuth. In the composite, p and q represent the weight percentage values of the composite wherein p and q are in the range of 0-100%. In some embodiments, p and q represent the weight percentage values of the composite with p+q=100 wt % and p is greater than 0, and 0≤q<100. The M material in the composite not only contributes to higher electronic conductivity and higher tap density, but also is receptive of ion storage such as lithium, sodium, potassium, calcium, magnesium, zinc, aluminum, and the like.

As noted above, the P, Sb, and M are present in the composite in the form of multi-phase microstructures. The microstructures can include an amorphous or crystalline phase of P, an amorphous or crystalline phase of metal phosphide, an amorphous or nanocrystalline phase of a metal phosphide, and/or an amorphous or nanocrystalline phase of Sb or M. This includes, in some embodiments, where the microstructures can include an amorphous phase of phosphorus, a nanocrystalline phase of metal (M) phosphides, or a nanocrystalline phase of antimony and/or M. The amorphous phase imparts good cycle stability to the material, while the nanocrystalline phases impart good capabilities to the material.

The amorphous phosphorus particles may include red phosphorus, black phosphorus, white phosphorus, violet phosphorus, or a combination of any two or more thereof. They may have a particle size of about 1 nm to 50 nm. This includes amorphous phosphorus particles having a particle size of about 5 nm to about 50 nm, about 10 nm to about 50 nm, about 20 nm to about 50 nm, about 30 nm to about 50 nm, about 40 nm to about 50 nm.

The nanocrystalline Sb and the M or metal phosphides, when present, particles may have a particle size of about 0.1 nm to about 100 nm. This includes nanocrystalline Sb, M, or metal phosphides particles having a particle size of about 5 nm to about 100 nm, about 10 nm to about 100 nm, about 20 nm to about 100 nm, about 30 nm to about 100 nm, about 40 nm to about 100 nm, about 50 nm to about 100 nm, about 60 nm to about 100 nm, about 70 nm to about 100 nm, about 80 nm to about 100 nm, about 90 nm to about 100 nm. In some embodiments, the nanocrystalline Sb, M, or metal phosphides particles have a particle size of about 5 nm to about 50 nm. This includes nanocrystalline Sb, M, or metal phosphides particles having a particle size of about 5 nm to about 50 nm, about 10 nm to about 50 nm, about 20 nm to about 50 nm, about 30 nm to about 50 nm, about 40 nm to about 50 nm.

In some embodiments, the Sb or M is present as uniformly distributed atoms with the phosphorus in the form of Sb- or M-doped phosphorus, or individually in the $[P_xSb_yM_z]_p/[carbon]_q$ composite. The atomic-level Sb or M may have a particle size of about 0.1 nm to about 2 nm. To illustrate the doping, in some embodiments, x:y and x:z are greater than about 10:1. In other embodiments, x:y and x:z are from about 5:1 to 100:1. In other embodiments, x:y and x:z are about 5:1. In other embodiments, x:y or x:z is greater than about 10:1. In other embodiments, x:y or x:z is from about 5:1 to 100:1. In other embodiments, x:y or x:z is about 10:1. In some embodiments, x:(y+z) is greater than about 10:1. In other embodiments, x:(y+z) is from about 5:1 to 100:1. In other embodiments, x:(y+z) is about 10:1.

The conductive carbon matrix of the composite may include, but is not limited to, phase comprising but not limited to graphite, graphene, holey graphene, expanded graphite, reduced graphene oxide, acetylene black, Ketjenblack, BLACK PEARLS® 2000, VULCAN® XC-72, carbon black, a metal-organic framework, porous carbon, carbon spheres, or carbon aerogel, carbon nanofiber; and a second carbon phase comprising but not limited to single-walled carbon nanotubes, multi-walled carbon nanotubes, carbon nanofibers, carbon nanotube arrays, polypyrrole, or polyaniline, poly(3,4-ethylenedioxythiophene), poly(3,4-ethylenedioxythiophene) polystyrene sulfonate, and mixtures of any two or more such materials. Black Pearls® 2000 and Ketjenblack® are two examples of commercially available forms of carbon black. In some embodiments, the conductive carbon matrix includes a mixture of any two or more of graphite, graphene, expanded graphite, reduced graphene oxide, acetylene black, carbon black, metal-organic framework (e.g., a porous, ordered organic-inorganic composite material), porous carbon, carbon spheres, carbon aerogel, single-walled carbon nanotubes, multi-walled carbon nanotubes, carbon nanofibers, carbon nanotube arrays, polypyrrole, and polyaniline. In some embodiments, the conductive carbon matrix includes one or more of graphite, graphene, expanded graphite, reduced graphene oxide, acetylene black, carbon black, metal-organic framework (e.g., a porous, ordered organic-inorganic composite material), porous carbon, carbon spheres, and carbon aerogel. In further embodiments, the conductive carbon matrix further includes one or more of single-walled carbon nanotubes, multi-walled carbon nanotubes, carbon nanofibers, carbon nanotube arrays, polypyrrole, and polyaniline. The conductive carbon matrix not only facilitates the electronic transport, but accommodates the large volume changes of alloying anode materials during charge/discharge.

The conductive carbon matrix may have a high specific surface area to support the amorphous phosphorus and nanocrystalline Sb or M or metal phosphides particles. Without being bound by theory, the high surface area of the conductive carbon matrix enables a uniform dispersion of amorphous phosphorus and nanocrystalline Sb or M or metal phosphides particles in the $[P_xSb_yM_z]_p/[carbon]_q$ composite. This high surface area may prevent the aggregation of alloying-type particles during charge/discharge cycling. The alloying-type particle refers to the elements, M, that can alloy with lithium, sodium, potassium, calcium, magnesium, zinc, aluminum, and the like, to form the corresponding Li-M during charge/discharge. However, this process introduces large volume changes from M to Li-M, which result in rapid capacity fading. The high specific surface area may be about 100 to about 2600 $m^2$/g. This includes a specific surface area of about 200 to about 2600 $m^2$/g, about 400 to about 2600 $m^2$/g, about 600 to about 2600 $m^2$/g, about 800 to about 2600 $m^2$/g, about 1000 to about 2600 $m^2$/g, about 1200 to about 2600 $m^2$/g, about 1400 to about 2600 $m^2$/g, about 1600 to about 2600 $m^2$/g, about 1800 to about 2600 $m^2$/g, about 2000 to about 2600 $m^2$/g, or about 2200 to about 2600 $m^2$/g. In some embodiments, the high specific surface area is about 100, 200, 300, 400, 500, 600, 700, 800, 900, 1000, 1100, 1200, 1300, 1400, 1500, 1600, 1700, 1800, 1900, 2000, 2100, 2200, 2300, 2400, 2500, or 2600 $m^2$/g.

The conductive carbon matrix may be a dual-component conductive carbon matrix. Dual-component conductive carbon matrices include a first component that is graphite, graphene, expanded graphite, reduced graphene oxide, acetylene black, carbon black, metal-organic framework, porous carbon, carbon spheres, carbon aerogel, or a mixture of any two or more thereof, and a second component that is single-walled carbon nanotubes, multi-walled carbon nanotubes, carbon nanofibers, carbon nanotube arrays, polypyrrole, polyaniline, poly(3,4-ethylenedioxythiophene), poly(3,4-ethylenedioxythiophene), polystyrene sulfonate, or a mixture of any two or more thereof. Again, Black Pearls® 2000 and Ketjenblack® are two commercially available, and preferred, examples of carbon black. The second component has been found to increase the mechanical strength and/or the electronic conductivity of the $[P_xSb_yM_z]_p/[carbon]_q$ composite relative to a $[P_xSb_yM_z]_p/[carbon]_q$ composite containing a carbon matrix with only the first component. As an illustration of the $[P_xSb_yM_z]_p/[carbon]_q$ composite, FIG. 1 is a schematic representation showing the bulk carbon matrix, with nanocrystalline metal phosphide phases, nanocrystalline M phases, nanocrystalline Sb phases, and amorphous phosphorus.

The first component of the dual-component carbon matrix may be present in an amount of about 1% to about 80% by weight of the composite. This includes an amount of about 10% to about 80%, about 20% to about 80%, about 30% to about 80%, about 40% to about 80%, about 50% to about 80%, about 60% to about 80%, or about 70% to about 80% by weight of the composite. In some embodiments, the first component is present in an amount of about 1% to about 70% by weight of the composite. This includes an amount of about 10% to about 70%, about 20% to about 70%, about 30% to about 70%, about 40% to about 70%, about 50% to about 70%, or about 60% to about 70% by weight of the composite. In some embodiments, the first component is present in an amount of about 1, 2, 3, 4, 5, 6, 7, 8, 9, 10, 11, 12, 13, 14, 15, 16, 17, 18, 19, 20, 25, 30, 35, 40, 45, 50, 55, 60, 65, 70, 75, or 80%, including increments therein, by weight of the composite.

The first component may have a specific surface area of about 100 to about 2600 $m^2$/g. This includes a specific surface area of about 200 to about 2600 $m^2$/g, about 400 to about 2600 $m^2$/g, about 600 to about 2600 $m^2$/g, about 800 to about 2600 $m^2$/g, about 1000 to about 2600 $m^2$/g, about 1200 to about 2600 $m^2$/g, about 1400 to about 2600 $m^2$/g, about 1600 to about 2600 $m^2$/g, about 1800 to about 2600 $m^2$/g, about 2000 to about 2600 $m^2$/g, or about 2200 to about 2600 $m^2$/g. In some embodiments, the specific surface area is about 100, 200, 300, 400, 500, 600, 700, 800, 900, 1000, 1100, 1200, 1300, 1400, 1500, 1600, 1700, 1800, 1900, 2000, 2100, 2200, 2300, 2400, 2500, or 2600 $m^2$/g.

The second component of the dual-component carbon matrix may be present in an amount of about 0.5% to about 30% by weight of the composite. This includes an amount of about 1% to about 30%, 5% to about 30%, about 10% to about 30%, about 15% to about 30%, about 20% to about 30%, or about 25% to about 30% by weight of the composite. In some embodiments, the second component is present in an amount of about 0.5% to about 20% by weight of the composite. This includes an amount of about 1% to about 20%, 5% to about 20%, about 10% to about 20%, or about 15% to about 20% by weight of the composite. In some embodiments, the second component is present in an amount of about 0.1, 0.5, 1, 2, 3, 4, 5, 6, 7, 8, 9, 10, 11, 12, 13, 14, 15, 16, 17, 18, 19, 20, 21, 22, 23, 24, 25, 26, 27, 28, 29, or 30%, including increments therein, by weight of the composite.

The $[P_xSb_yM_z]_p/[carbon]_q$ composite may have a carbon matrix content of about 1% to about 70% by weight of the composite. This includes a carbon matrix content of about 5% to about 70%, about 10% to about 70%, about 15% to about 70%, about 20% to about 70%, about 25% to about 70%, about 30% to about 70%, about 35% to about 70%, about 40% to about 70%, about 45% to about 70%, or about 50% to about 70% by weight of the composite. In some embodiments, the phosphorus-carbon composite has a carbon matrix content of about 1% to about 60% by weight of the composite. This includes a carbon matrix content of about 5% to about 60%, about 10% to about 60%, about 15% to about 60%, about 20% to about 60%, about 25% to about 60%, about 30% to about 60%, about 35% to about 60%, about 40% to about 60%, about 45% to about 60%, or about 50% to about 60% by weight of the composite. In some embodiments, the phosphorus-carbon composite has a carbon matrix content of about 1% to about 50% by weight of the composite. This includes a carbon matrix content of about 5% to about 50%, about 10% to about 50%, about 15% to about 50%, about 20% to about 50%, about 25% to about 50%, about 30% to about 50%, about 35% to about 50%, about 40% to about 50%, or about 45% to about 50% by weight of the composite. In some embodiments, the phosphorus-carbon composite has a carbon matrix content of about 1, 2, 3, 4, 5, 6, 7, 8, 9, 10, 11, 12, 13, 14, 15, 16, 17, 18, 19, 20, 25, 30, 35, 40, 45, 50, 55, 60, 65, or 70%, including increments therein, by weight of the composite.

The $[P_xSb_yM_z]_p/[carbon]_q$ composite may have a $P_xSb_yM_z$ content of about 0.1% to about 99.9% by weight of the composite. This includes a $P_xSb_yM_z$ content of about 0.5% to about 99.9%, about 1% to about 99.9%, about 5% to about 99.9%, about 10% to about 99.9%, about 20% to about 99.9%, about 30% to about 99.9%, about 40% to about 99.9%, about 50% to about 99.9%, about 60% to about 99.9%, about 70% to about 99.9%, about 80% to about 99.9%, or about 90% to about 99.9% by weight of the composite. In some embodiments, the $[P_xSb_yM_z]_p/[carbon]_q$ composite has a $P_xSb_yM_z$ content of about 0.1% to about 99% by weight of the composite. This includes a $P_xSb_yM_z$ content of about 0.5% to about 99%, about 1% to about 99%, about 5% to about 99%, about 10% to about 99%, about 20% to about 99%, about 30% to about 99%, about 40% to about 99%, about 50% to about 99%, about 60% to about 99%, about 70% to about 99%, about 80% to about 99%, or about 90% to about 99% by weight of the composite. In some embodiments, the $[P_xSb_yM_z]_p/[carbon]_q$ composite has a $P_xSb_yM_z$ content of about 0.1% to about 90% by weight of the composite. This includes a $P_xSb_yM_z$ content of about 0.5% to about 90%, about 1% to about 90%, about 5% to about 90%, about 10% to about 90%, about 20% to about 90%, about 30% to about 90%, about 40% to about 90%, about 50% to about 90%, about 60% to about 90%, about 70% to about 90%, or about 80% to about 90% by weight of the composite. In some embodiments, the $[P_xSb_yM_z]_p/[carbon]_q$ composite has a $P_xSb_yM_z$ content of about 0.1% to about 80% by weight of the composite. This includes a $P_xSb_yM_z$ content of about 0.5% to about 80%, about 1% to about 80%, about 5% to about 80%, about 10% to about 80%, about 20% to about 80%, about 30% to about 80%, about 40% to about 80%, about 50% to about 80%, about 60% to about 80%, or about 70% to about 80% by weight of the composite. In some embodiments, the $[P_xSb_yM_z]_p/[carbon]_q$ composite has a $P_xSb_yM_z$ content of about 0.1, 0.5, 1, 2, 3, 4, 5, 6, 7, 8, 9, 10, 11, 12, 13, 14, 15, 16, 17, 18, 19, 20, 25, 30, 35, 40, 45, 50, 55, 60, 65, 70, 75, 80, 85, 90, 95, 99, or 99.9%, including increments therein, by weight of the composite.

In some embodiments, the $[P_xSb_yM_z]_p/[carbon]_q$ composite contains at least 49%, 55%, 60%, or at least 65% by weight of phosphorus in the composite to deliver an overall specific capacity of 1000 mAh/g.

Any of the above electroactive materials may also be used to form an anode for a battery. For examples, any of the materials may be combined with a further conductive agent and or a binder for application to a current collector to form the anode. When used the anodes are used in in rechargeable batteries, the batteries exhibit good cycle life and coulombic efficiency. The $P_xSb_yM_z$ multi-phase structure increases the volumetric capacity of the rechargeable batteries, due to the higher tap density of Sb and M than phosphorus.

The binder may be present in an amount from about 0.1 wt % to about 99 wt %. In some embodiments, the binder is present in the electrode in an amount of from about 5 wt % to about 20 wt %. Illustrative binders include materials such as, but not limited to, sodium carboxymethylcellulose, sodium alginate, poly(acrylic acid), lithiated poly(acrylic acid), sodiated poly(acrylic acid), poly (vinyl alcohol), polyvinyl acetate, poly (ethylene imine), carboxymethyl chitosan, glutaradehyde, ß-cyclodextrin polymer, Gum Arabic, PEDOT-PSS, polyacrylic latex, gelatin, polyamido amine, Polyvinylidene fluoride, polytetrafluoroethylene, polyethylene, polystyrene, polyethylene oxide, polyimide, styrene butadiene rubber (SBR), polythiophene, polyacetylene, poly (9,9-dioctylfluorene-co-fluorenone), poly(9,9-dioctylfluorene-co-fluorenone-co-methylbenzoic ester), or a blend of any two or more such polymers. In some embodiments, the binder is an electrically conductive polymer such as, but not limited to, polythiophene, polyacetylene, poly(9,9-dioctylfluorene-co-fluorenone), poly(9,9-dioctylfluorene-co-fluorenone-co-methylbenzoic ester), and a copolymer of any two or more such conductive polymers.

The current collector may be any of a wide variety of materials. For example, illustrative current collectors include, but are not limited to, copper, stainless steel, titanium, tantalum, platinum, palladium, gold, silver, iron, aluminum, nickel, rhodium, manganese, vanadium, titanium, tungsten, cobalt nickel alloy, highly alloyed ferritic stainless steel containing molybdenum and chromium; or nickel-, chromium-, or molybdenum-containing alloys, or a carbon-coated metal described above. The current collector may take the form of a foil, mesh, or screen. In some embodiments, the electroactive material disclosed herein and one or more of a conductive carbon material and a binder are contacted with the current collector by casting, pressing, or rolling the mixture thereto. In some embodiments, the current collector is copper, stainless steel, titanium, tantalum, platinum, gold, aluminum, nickel, cobalt, cobalt nickel alloy, highly alloyed ferritic stainless steel containing molybdenum and chromium, a nickel-containing alloy, a chromium-containing alloy, or a molybdenum-containing alloy.

In another aspect an electrochemical device is provided that includes any of the $[P_xSb_yM_z]_p/[carbon]_q$ materials described herein. The electrochemical devices may include the anode that incorporates any of the $[P_xSb_yM_z]_p/[carbon]_q$ materials described herein. Such electrochemical devices may also include a cathode and, optionally, a separator between the cathode and the anode. The cathodes may include a cathode active material and a current collector, a conductive carbon material, and/or a binder. The electrochemical devices may also include an electrolyte. In various embodiments, the electrochemical device is a lithium ion battery, a sodium ion battery, a potassium-ion battery, a zinc-ion battery, a calcium-ion battery, a magnesium-ion battery, or an aluminum-ion battery.

In another aspect, disclosed herein are electrochemical devices including an anode containing a $[P_xSb_yM_z]_p/[carbon]_q$ composite disclosed herein. In some embodiments, the electrochemical devices are sodium-ion batteries. In further embodiments, the electrochemical devices are room-temperature sodium-ion batteries. In some embodiments, the electrochemical devices are primary batteries, secondary batteries, or capacitors. In some embodiments, the electrochemical devices are secondary sodium-ion batteries.

In some embodiments, the electrochemical device may be a potassium-ion battery, a zinc-ion battery, a calcium-ion battery, a magnesium-ion battery, or an aluminum-ion battery.

Illustrative cathode materials for lithium-ion batteries include, but are not limited to, $LinCoO_2$, $LinMnO_2$, $LinNiO_2$, $LiNi_xCo_yMn_zO_2$ (x+y+z=1), $Li_{1+x}Ni_yCo_zMn_{1-x-y-z}O_2$, $LiMn_2O_4$, $LiNi_{0.5}Mn_{1.5}O_4$, $Li_nCo_{2/3}Mn_{1/3}O_2$, $Li_n$-$Ni_xZn_yMn'_zO_2$ (5x'+y'+z'=1), $LiFePO_4$, $Li_xFe_{0.5}Mn_{0.5}PO_4$, $Li_3V_2(PO_4)_3$, $Li_2FePO_4F$, or $LiFeSO_4F$ or any combination thereof, wherein 0<n<1.

Illustrative cathode materials for sodium-ion batteries include, but are not limited to, $Na_nCoO_2$, $Na_nMnO_2$, $Na_nNiO_2$, $Na_nCo_{2/3}Mn_{1/3}O_2$, $Na_nNi_xZn_yMn'_zO_2$ (5x'+y'+z'=1), $NaFePO_4$, $Na_xFe_{0.5}Mn_{0.5}PO_4$, $Na_3V_2(PO_4)_3$, $Na_2FePO_4F$, or $NaFeSO_4F$, purrsian blue, purrsian white, $Na_2C_6O_6$, or any combination thereof, wherein 0<n<1.

Illustrative cathode materials for potassium-ion batteries include, but are not limited to, $K_nCoO_2$, $K_nMnO_2$, $K_nNiO_2$, $KNi_xCo_yMn_zO_2$ (x+y+z=1), $K_{1+x}Ni_yCo_zMn_{1-x-y-z}O_2$, $KMn_2O_4$, $KNi_{0.5}Mn_{1.5}O_4$, $KnCo_{2/3}Mn_{1/3}O_2$, $K_nNi_xZn_yMn'_zO_2$ (5x'+y'+z'=1), $KFePO_4$, $K_xFe_{0.5}Mn_{0.5}PO_4$, $K_3V_2(PO_4)_3$, $K_2FePO_4F$, or $KFeSO_4F$, $KFe[Fe(CN)_6]O_2$, $K_2Fe[Fe(CN)_6]O_2$, $K_2Mn[Fe(CN)_6]O_2$, $K_2C_6O_6$, or any combination thereof, wherein 0<n<1.

Illustrative conductive carbon materials for the cathode include, but are not limited to, microporous carbon, mesoporous carbon, mesoporous microbeads, graphite, expandable graphite, carbon black, or carbon nanotubes, or any combination thereof. Commercial examples of carbon black include, but are not limited to, Super P, Black Pearls® 2000, Denka Black, Vulcan XC72R, and Ketjenblack®.

The current collector for the cathode may be prepared from a wide variety of materials. For example, illustrative current collectors include, but are not limited to, copper, stainless steel, titanium, tantalum, platinum, palladium, gold, silver, iron, aluminum, nickel, rhodium, manganese, vanadium, titanium, tungsten, cobalt nickel alloy, highly alloyed ferritic stainless steel containing molybdenum and chromium; or nickel-, chromium-, or molybdenum-containing alloys, or a carbon-coated metal described above. The current collector may take the form of a foil, mesh, or screen.

When used, the binder for the cathode may be present in the electrode in an amount of from about 0.1 wt % to about 99 wt %. In some embodiments, the binder is present in the electrode in an amount of from about 2 wt % to about 20 wt %. Illustrative binders include, but are not limited to, polyvinylidene fluoride (PVDF), polyvinyl alcohol (PVA), polyethylene, polystyrene, polyethylene oxide, polytetrafluoroethylene (Teflon), polyacrylonitrile, polyimide, styrene butadiene rubber (SBR), carboxy methyl cellulose (CMC), gelatine, sodium alginate, polythiophene, polyacetylene, poly(9,9-dioctylfluorene-co-fluorenone), poly(9,9-dioctylfluorene-co-fluorenone-co-methylbenzoic ester), a copolymer of any two or more such polymers, and a blend of any two or more such polymers. In some embodiments, the binder is an electrically conductive polymer such as, but not limited to, polythiophene, polyacetylene, poly(9,9-dioctylfluorene-co-fluorenone), poly(9,9-dioctylfluorene-co-fluorenone-co-methylbenzoic ester), and a copolymer of any two or more such conductive polymers.

Illustrative separators include, but are not limited to, Celgard 2325, Celgard 2400, Celgard 3501, glass fiber separator.

In some embodiments, the electrolyte includes a lithium salt and a solvent. The sodium salt may be $LiClO_4$, $LiPF_6$, $LiAsF_6$, $LiBF_4$, $LiCF_3SO_3$, or $LiN(SO_2CF_3)$, or any combination thereof. The salt may be present in the electrolyte at a concentration of about 0.01 M to about 3.0 M. This includes a concentration of about 0.01 M to about 2.5 M, about 0.01 M to about 2.0 M, about 0.01 M to about 2.0 M, about 0.01 M to about 1.5 M, about 0.01 M to about 1.0 M, about 0.01 M to about 0.5 M, or about 0.01 M to about 0.1 M. In some embodiments, the salt is present in the electrolyte at a concentration of about 0.5 M to about 3.0 M. This includes a concentration of about 0.5 M to about 2.0 M, about 0.5 M to about 1.5 M, about 1.0 M to about 3.0 M, or about 1.0 M to about 2.0 M. In some embodiments, the salt is present in the electrolyte at a concentration of about 0.01, 0.05, 0.1, 0.5, 1.0, 1.5, 2.0, 2.5, or 3.0 M, including increments therein.

In some embodiments, the electrolyte includes a sodium salt and a solvent. The sodium salt may be $NaClO_4$, $NaPF_6$, $NaAsF_6$, $NaBF_4$, $NaCF_3SO_3$, or $NaN(SO_2CF_3)$, or any combination thereof. The salt may be present in the electrolyte at a concentration of about 0.01 M to about 3.0 M. This includes a concentration of about 0.01 M to about 2.5 M, about 0.01 M to about 2.0 M, about 0.01 M to about 2.0 M, about 0.01 M to about 1.5 M, about 0.01 M to about 1.0 M, about 0.01 M to about 0.5 M, or about 0.01 M to about 0.1 M. In some embodiments, the salt is present in the electrolyte at a concentration of about 0.5 M to about 3.0 M. This includes a concentration of about 0.5 M to about 2.0 M, about 0.5 M to about 1.5 M, about 1.0 M to about 3.0 M, or about 1.0 M to about 2.0 M. In some embodiments, the salt is present in the electrolyte at a concentration of about 0.01, 0.05, 0.1, 0.5, 1.0, 1.5, 2.0, 2.5, or 3.0 M, including increments therein.

In some embodiments, the electrolyte includes a sodium salt and a solvent. The sodium salt may be $KClO_4$, $KPF_6$, $KAsF_6$, $KBF_4$, $KCF_3SO_3$, or $KN(SO_2CF_3)$, or any combination thereof. The salt may be present in the electrolyte at a concentration of about 0.01 M to about 3.0 M. This includes a concentration of about 0.01 M to about 2.5 M, about 0.01 M to about 2.0 M, about 0.01 M to about 2.0 M, about 0.01 M to about 1.5 M, about 0.01 M to about 1.0 M, about 0.01 M to about 0.5 M, or about 0.01 M to about 0.1 M. In some embodiments, the salt is present in the electrolyte at a concentration of about 0.5 M to about 3.0 M. This includes a concentration of about 0.5 M to about 2.0 M, about 0.5 M to about 1.5 M, about 1.0 M to about 3.0 M, or about 1.0 M to about 2.0 M. In some embodiments, the salt is present in the electrolyte at a concentration of about 0.01, 0.05, 0.1, 0.5, 1.0, 1.5, 2.0, 2.5, or 3.0 M, including increments therein.

The organic solvent may be at least one of ethylene carbonate, propylene carbonate, diethyl carbonate, dimethyl carbonate, ethyl methyl carbonate, tetraethylene glycol, dimethylsulfolane, 1,2-dimethoxyethane, and 1,2-diethoxyethane.

In some embodiments, the electrolyte further includes an electrolyte additive. Illustrative electrolyte additives include, but are not limited to, vinylene carbonate, fluorinated ethylene carbonated, cyclic disulfonic ester methylene methanedisulfonate (MMDS), lithium bis(oxolate)borate, sodium bis (oxolate)borate, potassium bis (oxolate)borate, ethylene sulfite, ethylene sulfate, trimethylene sulfite, 1,3-butylene glycol sulfite, tris(trimethylsilyl) phosphate (TMSP) and tris(trimethylsilyl)borate (TMSB). The electrolyte additive may be present in the electrolyte in an amount of about 1% to about 10% by weight or by volume. This includes an amount of about 1% to about 8% by weight or by volume, about 1% to about 6% by weight or by volume, about 1% to about 4% by weight or by volume, or about 1% to about 3% by weight or by volume. In some embodiments, the electrolyte additive is present in the electrolyte in an amount of about 1, 2, 3, 4, 5, 6, 7, 8, 0.9, or 10% by weight or by volume.

In another aspect, a method is provided for preparing a $[P_xSb_yM_z]_p/[carbon]_q$ composite. The method includes ball milling a mixture of phosphorus, antimony, and, optionally, one or more metals M, along with a conductive carbon matrix. As noted above, M may be one or more of tin, germanium, lead, silicon, arsenic, selenium, bismuth, aluminum, nickel, manganese, molybdenum, niobium, tungsten, tantalum, iron, copper, titanium, vanadium, chromium, nickel, cobalt, zirconium, or yttrium. For the method, the conductive carbon matrix may include one or more of graphite, graphene, expanded graphite, reduced graphene oxide, Black Pearls® 2000, Ketjenblack®, acetylene black, carbon black, a metal-organic framework, porous carbon, carbon spheres, carbon aerogel, single-walled carbon nanotubes, multi-walled carbon nanotubes, carbon nanofibers, carbon nanotube arrays, polypyrrole, and polyaniline. In some embodiments, the phosphorus is red phosphorus, black phosphorus, or a combination thereof. In some embodiments, the phosphorus is red phosphorus.

For the method of preparation, a ball milling apparatus is used to ensure thorough mixing of the starting materials. Preferably, the electroactive materials are prepared by ball-milling phosphorus, antimony and one or more metals, and a carbon source under high shear and high impact for an appropriate period of time. Ball-mills such as a vertical ball-mill (ATTRITOR, Union Process Inc., Akron, Ohio), a SPEXMILL (Spex CertiPrep, Metuchen, N.J.), a horizontal rotary ball-mill (SIMOLOYER, ZoZGmbH Werden, Germany) or other ball-mills known in the art also may be used.

The ball milling may be performed at a rotation speed of about 300 to about 1500 rpm (revolutions per minute). This includes a rotation speed of about 400 to about 1500 rpm, about 500 to about 1500 rpm, about 600 to about 1500 rpm, about 700 to about 1500 rpm, about 800 to about 1500 rpm, about 900 to about 1500 rpm, about 1000 to about 1500 rpm, about 1100 to about 1500 rpm, about 1200 to about 1500 rpm, about 1300 to about 1500 rpm, or about 1400 to about 1500 rpm. In some embodiments, the rotation speed is about 300, 400, 500, 600, 700, 800, 900, 1000, 1100, 1200, 1300, 1400, or 1500, including increments therein, rpm.

The ball milling may be performed for a time period of about 1 to about 40 hours. This includes a time period of about 2 to about 40 hours, about 3 to about 40 hours, about 4 to about 40 hours, about 5 to about 40 hours, about 6 to about 40 hours, about 7 to about 40 hours, about 8 to about 40 hours, about 9 to about 40 hours, about 10 to about 40 hours, about 11 to about 40 hours, about 12 to about 40 hours, about 15 to about 40 hours, about 20 to about 40 hours, about 25 to about 40 hours, about 30 to about 40 hours, or about 35 to about 20 hours. In some embodiments, the ball milling is performed for a time period of about 1 to about 15 hours. This includes a time period of about 2 to about 15 hours, about 3 to about 15 hours, about 4 to about 15 hours, about 5 to about 15 hours, about 6 to about 15 hours, about 7 to about 15 hours, about 8 to about 15 hours, about 9 to about 15 hours, or about 10 to about 15 hours.

The ball milling may be conducted in a variety of containers. An illustrative container is an agate container having agate balls, or a zirconium container containing zirconium balls, under inert atmosphere (e.g., argon gas), and at a rotation speed of about 300-1500 rpm for about 1 to 20 hours.

The present invention, thus generally described, will be understood more readily by reference to the following examples, which are provided by way of illustration and are not intended to be limiting of the present invention.

EXAMPLES

Example 1. Preparation of a $P_{3.93}Sb$ (70 wt %)/Ketjenblack-MWCNTs Composite. Red phosphorus, antimony, Ketjenblack®, and multi-walled carbon nanotubes (MWCNTs) were mixed in weight ratio of 3.5/3.5/2.5/0.5 in a glove box (argon filled) and then transferred to a high energy ball milling machine and ball milled at 1425 rpm for 700 minutes. The weight ratio of the balls and the mixture was maintained in a ratio of 10.

Example 2. Preparation of a P (70 wt %)/Ketjenblack-MWCNTs Composite. Red phosphorus, Ketjenblack® and multi-walled carbon nanotubes (MWCNTs) were mixed in weight ratio of 7/2.5/0.5 in a glove box (argon filled) and then transferred to a high energy ball milling machine and ball milled at 1425 rpm for 700 minutes. The weight ratio of the balls and the mixture was maintained in a ratio of 10.

Example 3. Preparation of a Sb (70 wt %)/Ketjenblack-MWCNTs Composite. Antimony, Ketjenblack® and multi-walled carbon nanotubes (MWCNTs) were mixed in weight ratio of 7/2.5/0.5 in a glove box (argon filled) and then transferred to a high energy ball milling machine and ball milled at 1425 rpm for 700 minutes. The weight ratio of the balls and the mixture was maintained in a ratio of 10.

Example 4. Preparation of a $P_{37.2}Sb$ (70 wt %)/Ketjenblack-MWCNTs Composite. Red phosphorus, antimony, Ketjenblack®, and multi-walled carbon nanotubes (MWCNTs) were mixed in weight ratio of 6.3/0.7/2.5/0.5 in a glove box (argon filled) and then transferred to a high energy ball milling machine and ball milled at 1425 rpm for 700 minutes. The weight ratio of the balls and the mixture was maintained in a ratio of 10.

Figure 2:
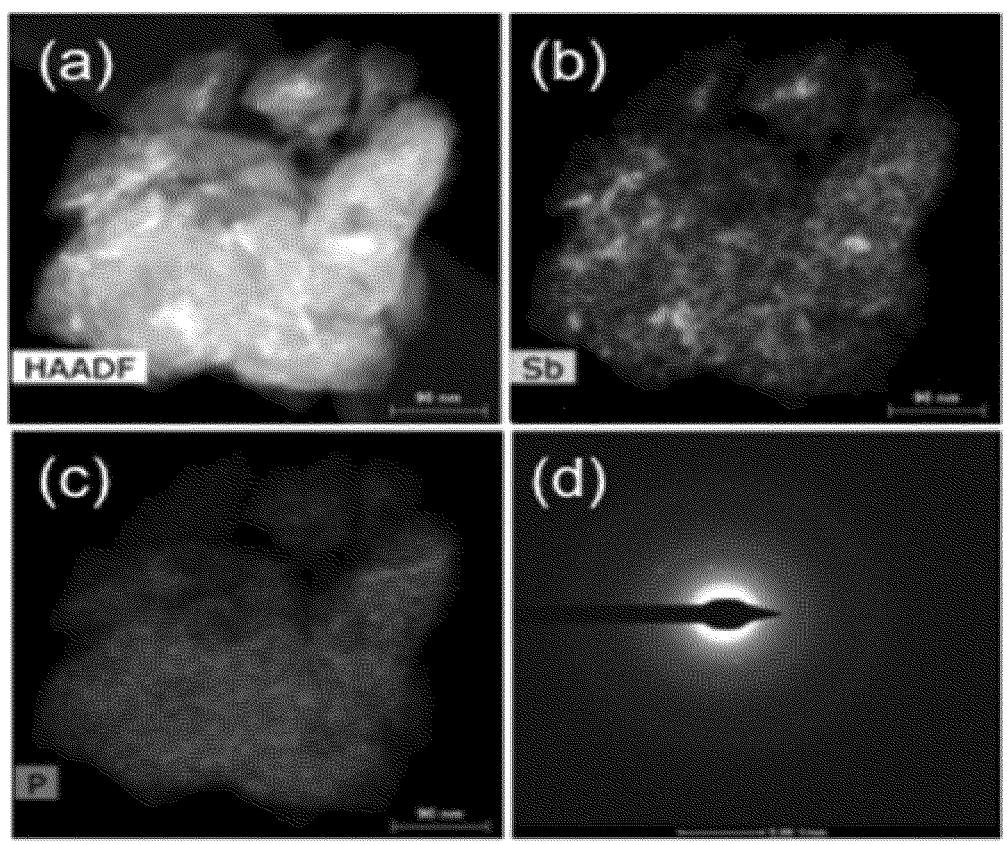
FIG. 2 is a representative high angle annular dark field transmission electron microscopy (HAADF-TEM) image and the corresponding TEM elemental mapping, according to the examples.

Example 5. The microstructure and morphology of the $P_{3.93}Sb$ (70 wt %)/Ketjenblack-MWCNTs Composite of Example 1. The microstructure and morphology of the $P_{3.93}Sb$ (70 wt %)/Ketjenblack-MWCNTs of Example 1 were examined with high-angle annular dark field-transmission electron microscopy (HAADF-TEM). In the dark-field TEM image, the elements with heavy Z value will become brighter due to the contrast between high Z element (e.g. Sb and P) and low Z element (e.g. carbon). As shown, no obvious aggregation of phosphorus and antimony was observed (FIG. 2a), and Sb (FIG. 2b) and P (FIG. 2c) were throughout the sample in FIG. 2a, indicating a uniform mixing of P and Sb in the composite. The selected area electron diffraction (SAED) of the $SbP_{3.93}$ (70 wt %)/Ketjenblack-MWCNTs composite only shows minor diffraction spot, indicating that most of Sb and P exist in an amorphous phase with a few nanocrystalline Sb or antimony phosphides nanoparticles.

Figure 3:
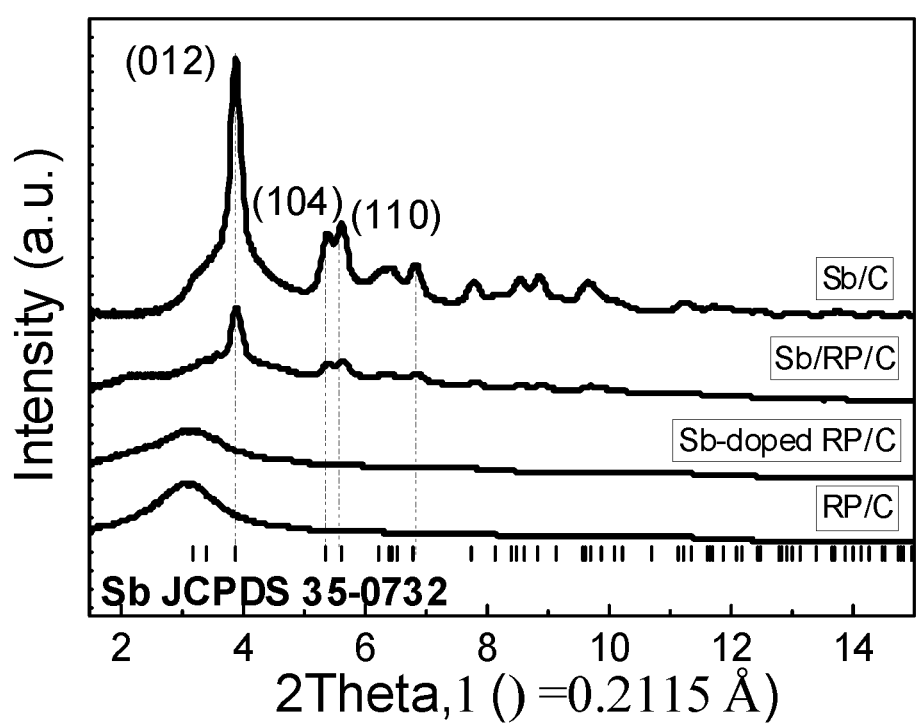
FIG. 3 is a representative X-ray diffraction pattern of a $[P_xSb_yM_z]_p/[carbon]_q$ composite.

Example 6. The crystal structures of the $[P_xSb_yM_z]_p/$ $[carbon]_q$ composites were examined by X-ray diffraction (XRD), which can detect the long-range order of crystalline structures. The XRD results showed that the resulted P (70 wt %)/Ketjenblack-MWCNTs composite of Example 2 and the $SbP_{37.2}$ (70 wt %)/Ketjenblack-MWCNTs composite of Example 4 with low Sb content are both amorphous due to no appearance of sharp XRD peaks, while the resulted $SbP_{3.93}$ (70 wt %)/Ketjenblack-MWCNTs composite of Example 1 and the Sb (70 wt %)/Ketjenblack-MWCNTs composite of Example 3 are both nanocrystalline as can be seen from the crystalline XRD peaks (FIG. 3)

Figure 4:
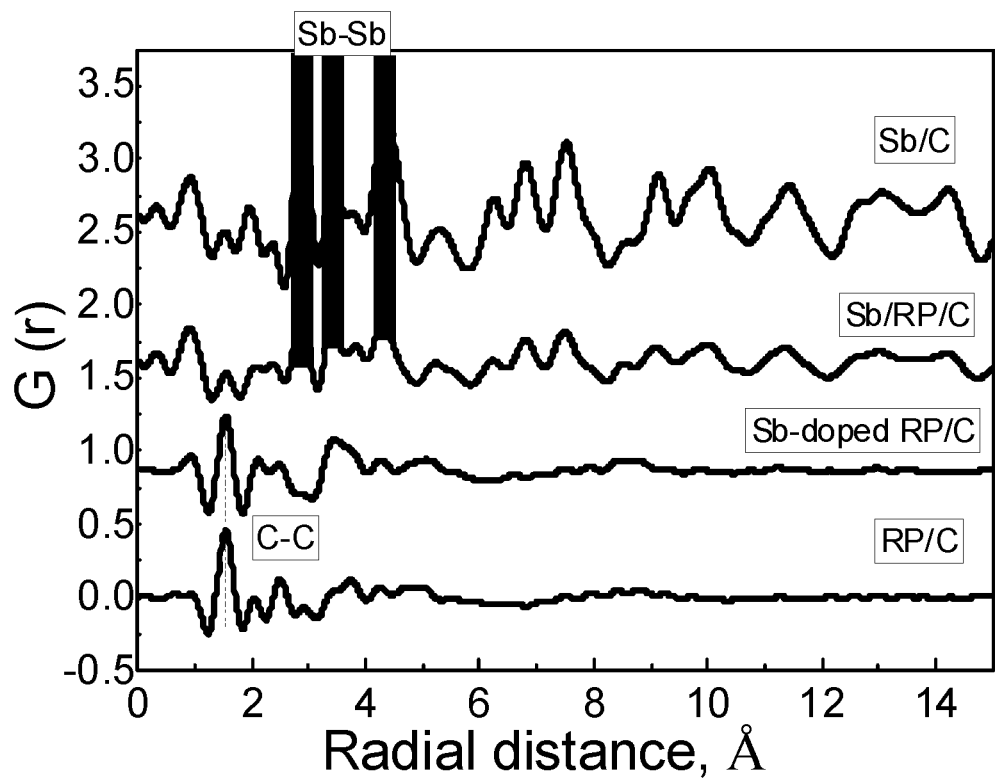
FIG. 4 is a representative pair distribution function of a $[P_xSb_yM_z]_p/[carbon]_q$ composite.

Example 7. The crystal structures of the $[P_xSb_yM_z]_p/$ $[carbon]_q$ composites were further examined by pair distribution function (PDF) analysis, which can detect the short-range and long-range order structure in the materials. The PDF results confirmed the crystalline structure of the $SbP_{3.93}$ (70 wt %)/Ketjenblack-MWCNTs composite of Example 1 and the Sb (70 wt %)/Ketjenblack-MWCNTs composite of Example 3, as can be seen from the obvious peak osillations of Sb (FIG. 4). While the resulted P (70 wt %)/Ketjenblack-MWCNTs composite of Example 2 and the $SbP_{37.2}$ (70 wt %)/Ketjenblack-MWCNTs composite of Example 4 with low Sb content are both amorphous, and the Sb in the $SbP_{37.2}$ (70 wt %)/Ketjenblack-MWCNTs composite of Example 4 are uniformly distributed in atomic level due to no appearance of Sb osillations (FIG. 4).

Example 8. Battery incorporating the P (70 wt %)/Ketjenblack-MWCNTs Composite of Example 2. The P (70 wt %)/Ketjenblack-MWCNTs composite of Example 2 was mixed with 15 wt % of Super-P and 15 wt % of sodium alginate (2 wt % in water) as the binder. The well-mixed slurry was then cast onto a sheet of copper foil by a doctor blade on an automatic film coater. The film was vacuum dried at 80° C. for 12 h, and then transferred to a glove box filled with argon, before being punched out as circular disks, 14 mm in diameter. An electrolyte was prepared with 1.0 M $NaPF_6$ in a solvent mixture of propylene carbonate (PC) with 2 vol. % fluorinated ethylene carbonate. A CR2032 coin cell was then assembled using the electrode disk, the electrolyte, sodium foil as a counter electrode, and a glass fiber separator. Cell assembly was conducted under argon.

Figure 5:
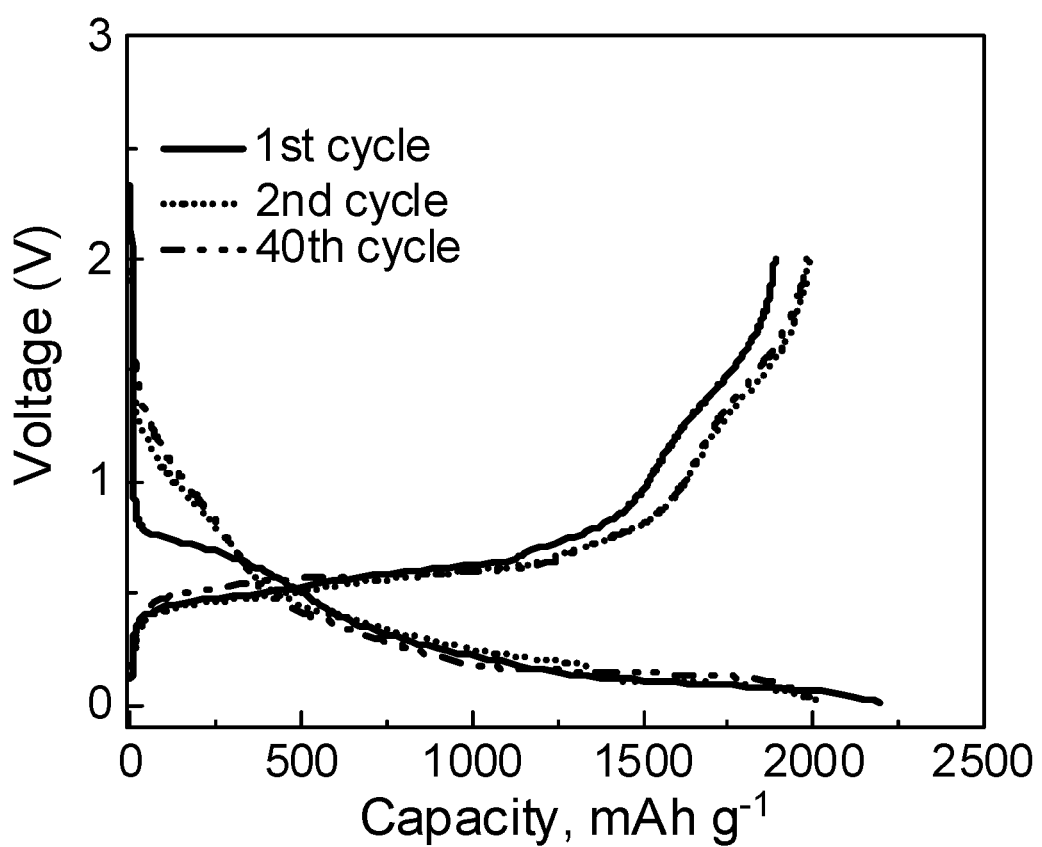
FIG. 5 is a charge/discharge curve for a phosphorus-carbon composite with 70 wt % P loading in the composite at C/10, according to the examples.

Example 9. Electrochemical properties of the battery of Example 8. The charge/discharge profile of the P (70 wt %)/Ketjenblack-MWCNTs composite anode of Example 2 at C/10 (1 C=2600 mA $g^{-1}$) is shown in FIG. 5. With regard to the discharge profiles, the general sodiation curves include a sloping region from about 1.0 to 0.5 V (vs. $Na/Na^+$), followed by an inclined plateau from about 0.5 to 0.10 V (vs. $Na/Na^+$), and another sloping region from about 0.10 to 0.01 V (vs. $Na/Na^+$). With regard to the charge profiles, the de-sodiation curves include a sloping region from 0.01 to 0.4 V (vs. $Na/Na^+$), an inclined plateau from 0.4 to 0.8 V (vs. $Na/Na^+$), and followed by a sloping region up to 2 V (vs. $Na/Na^+$).

Figure 6:
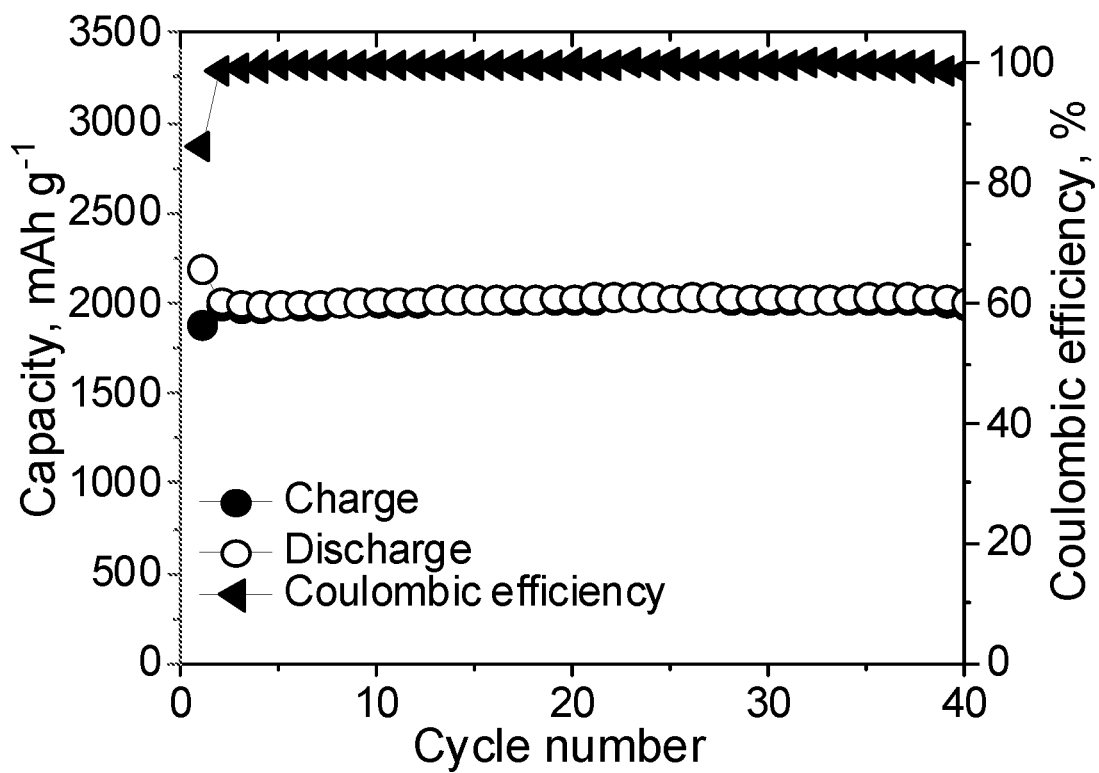
FIG. 6 is a graph of the cycle performance of the phosphorus-carbon composite of Example 2 at C/10.

The cycle performance of P (70 wt %)/Ketjenblack-MWCNTs composite is shown in FIG. 6. The initial discharge and charge capacity were determined to be 2193.9 mAh/g and 1887.4 mAh/g, respectively, resulting in a high, initial coulombic efficiency of about 86%, and a high utilization of 72.7%, compared to the theoretical capacity of phosphorus (2596 mAh/g). Upon continuous charge/discharge at C/10, the P (70 wt %)/Ketjenblack-MWCNTs composite anode maintained its capacity for 40 cycles, indicating excellent cycle and capacity stability. The discharge capacity after 40 cycles was measured at 1981.8 mAh/g, corresponding to capacity retention as high as ~100%. The superior cycle stability of the P (70 wt %)/Ketjenblack-MWCNTs composite clearly confirmed its highly reversible sodiation/de-sodiation during charge/discharge indicating that large volume changes have been suppressed using this approach. Unless otherwise specified, the capacities as described herein are calculated based on the active materials of phosphorus in the phosphorus-carbon composite. Even considering the content of phosphorus in the electrode, the P (70 wt %)/Ketjenblack-MWCNTs composite maintains a high overall capacity of ~1000 mAh/g for 40 cycles.

Figure 7:
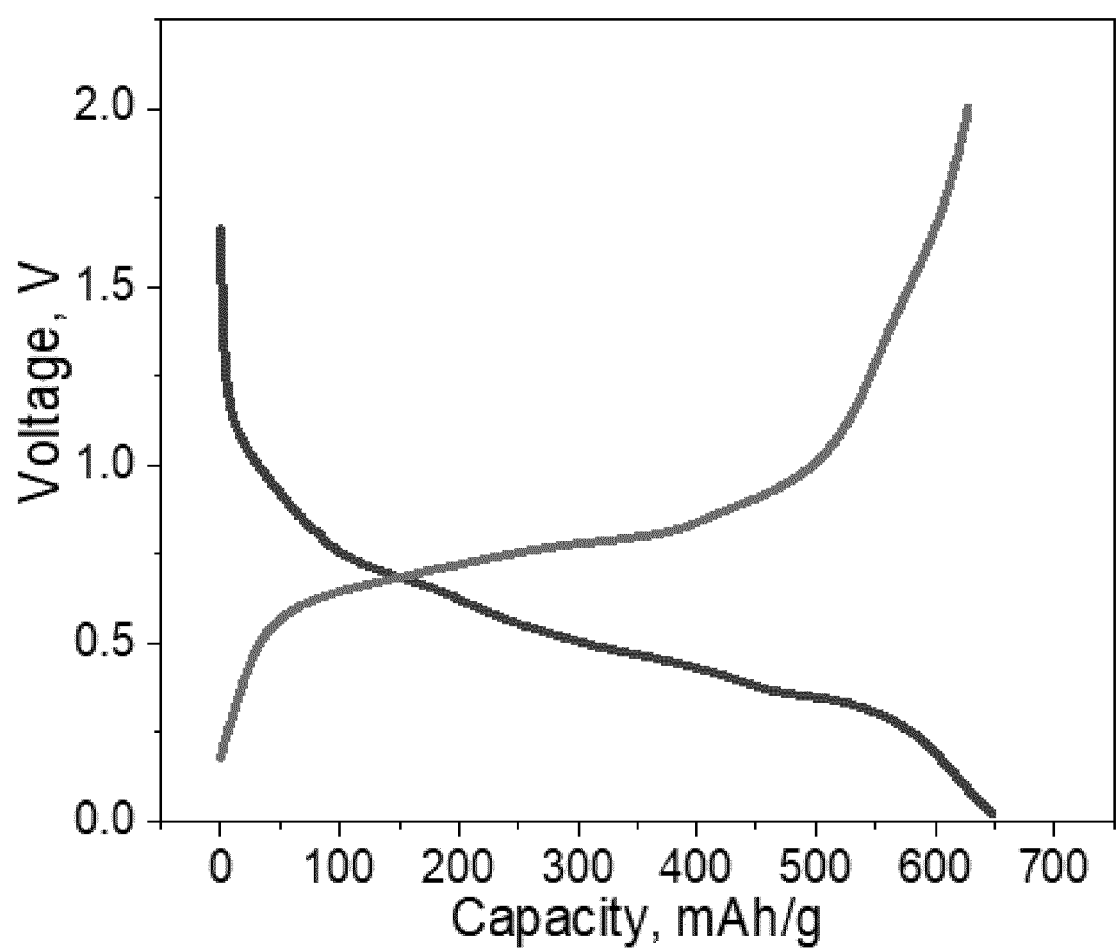
FIG. 7 is a charge/discharge curve of an antimony-carbon composite with 70 wt % Sb loading in the composite at C/3, according to the examples.

Example 10. Electrochemical properties of a battery that includes a Sb (70 wt %)/Ketjenblack-MWCNTs composite, prepared as in Example 8, but with the Sb composite material instead. The charge/discharge profile of the Sb (70 wt %)/Ketjenblack-MWCNTs composite anode of Example 3 at C/3 (1 C=660 mA $g^{-1}$) is shown in FIG. 7. In the discharge profile, the general sodiation curves consisted of a sloping region from 0.75 to 0.25 V (vs. $Na/Na^+$), corresponding to the sodiation between Na and Sb to form $Na_3Sb$. With regard to the charge profiles, the de-sodiation curves include a sloping region centered at 0.75 V and corresponding to the desodation of $Na_3Sb$ to Sb.

Figure 8:
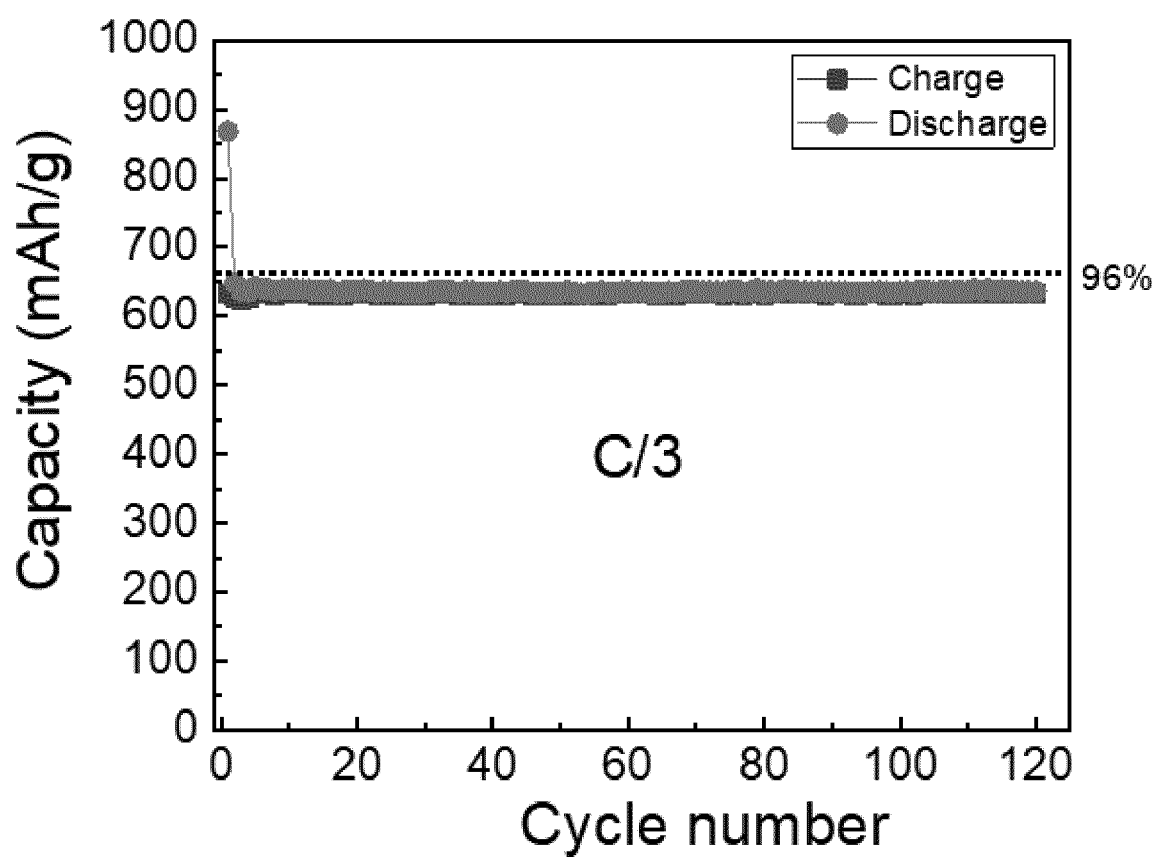
FIG. 8 is a graph of the cycle performance for a antimony-carbon composite of Example 3 at C/3.
Figure 9:
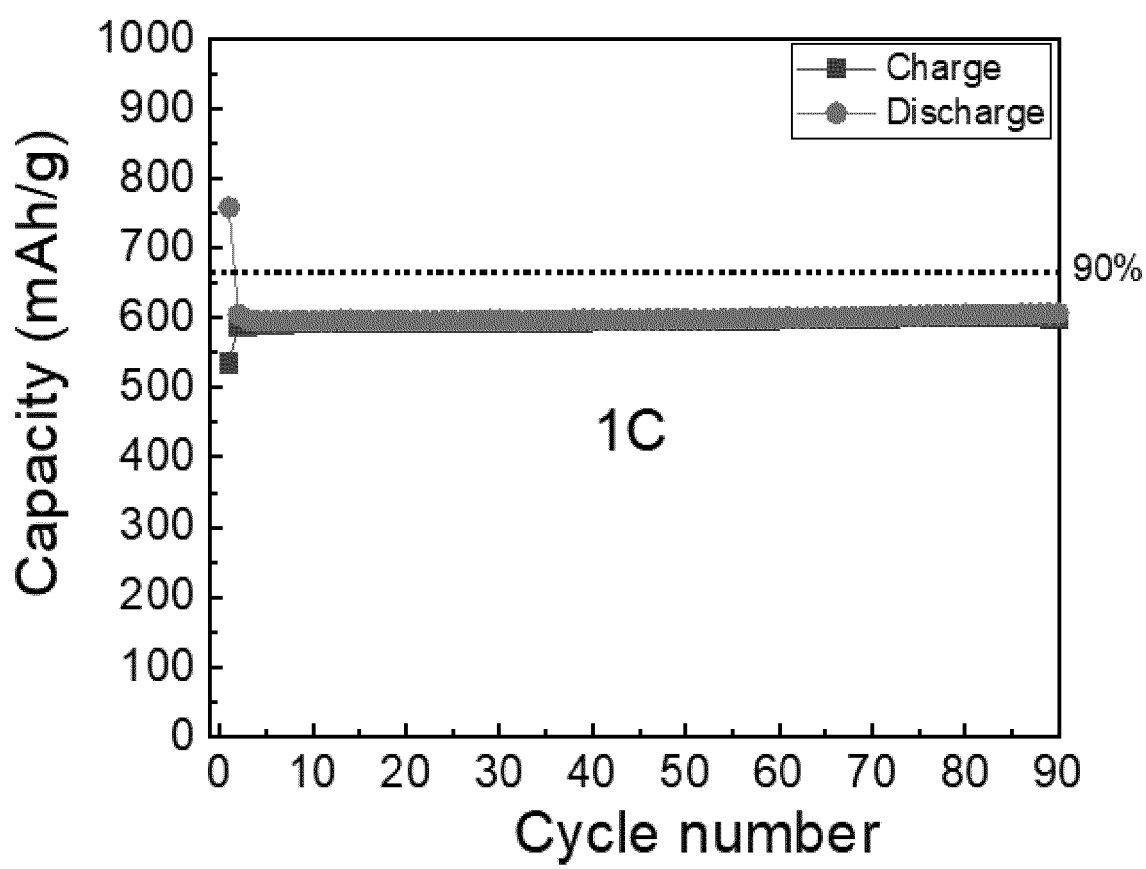
FIG. 9 is a graph of cycling performance for a antimony-carbon composite with 70 wt % Sb loading in the composite at 1 C, according to the examples.

The cycle performance of the Sb (70 wt %)/Ketjenblack-MWCNTs composite at C/3 is shown in FIG. 8. As shown, the Sb (70 wt %)/Ketjenblack-MWCNTs composite anode delivers a reversible capacity of about 632 mAh/g (about 96% of the theoretical capacity of Sb), and can maintain stable capacities for 120 cycles, indicating excellent cycle stability. The discharge capacity after 120 cycles was determined to be 632.6 mAh/g, corresponding to capacity retention as high as 100%. The superior cycle stability of the Sb (70 wt %)/Ketjenblack-MWCNTs composite confirms its highly reversible sodiation/de-sodiation during charge/discharge. This, too, indicates that large volume changes have been suppressed the described approach. Moreover, due to the higher electronic conductivity of Sb than P, as well as the better ionic diffusion of nanocrystalline Sb than amorphous P, when cycling at higher rate of 1 C (FIG. 9), the Sb (70 wt %)/Ketjenblack-MWCNTs demonstrate very good cycle stability, with negligible capacity loss when increasing the rate from C/3 to 1 C (581.3 mAh/g).

Figure 10:
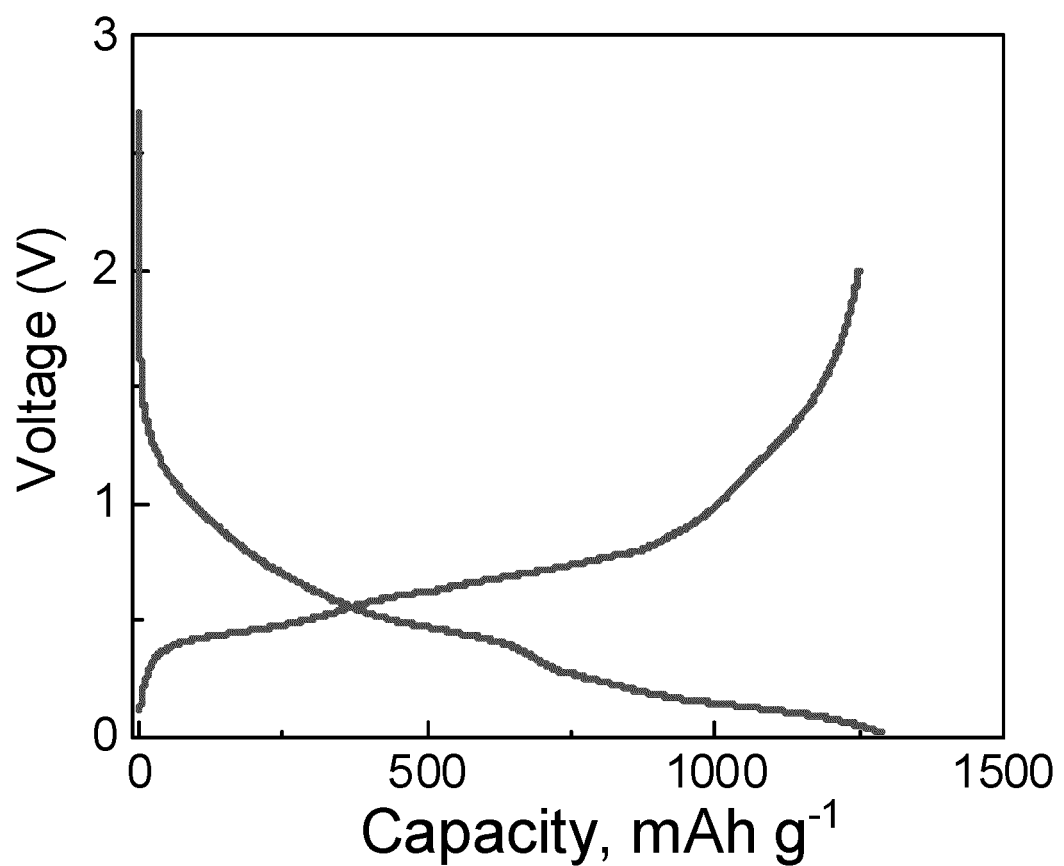
FIG. 10 is a charge/discharge curve for a $SbP_{3.93}$/carbon composite with 70 wt % $SbP_{3.93}$ loading in the composite of Example 1 at C/3.
Figure 11:
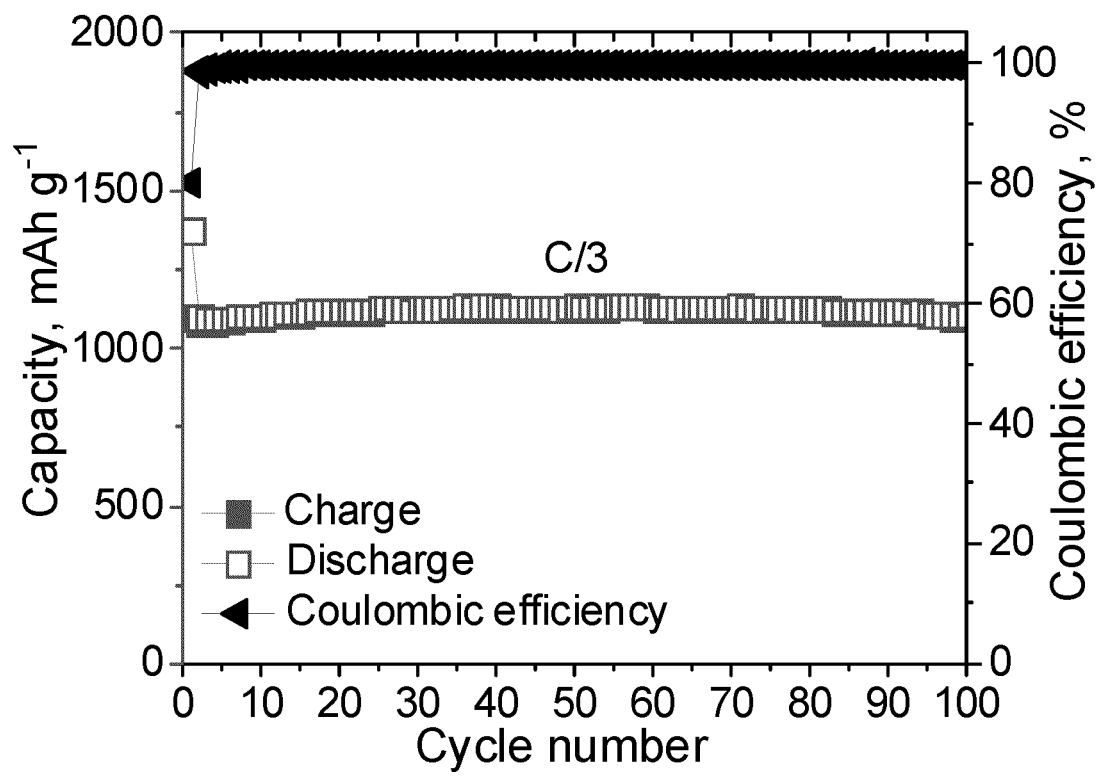
FIG. 11 is a graph of the cycling performance of a $SbP_{3.93}$/carbon composite with 70 wt % $SbP_{3.93}$ loading in the composite of Example 1 at C/3.

Example 11. Electrochemical properties of a battery including a $SbP_{3.93}$ (70 wt %)/Ketjenblack-MWCNTs Composite, prepared as in Example 8, but with the $SbP_{3.93}$ composite material instead. The charge/discharge profiles for a $P_{3.93}Sb$ (70 wt %)/Ketjenblack-MWCNTs composite anode (according to Example 1) at C/3 are shown in FIG. 10. As shown, the $P_{3.93}Sb$ (70 wt %)/Ketjenblack-MWCNTs composite exhibited both sodiation/de-sodiation features of Sb and P. For the cycle stability, the $P_{3.93}Sb$ (70 wt %)/Ketjenblack-MWCNTs composite delivers an ultrastable capacity of about 1100 mAh/g within 100 cycles (FIG. 11). The capacity loss during 100 cycles is as small as 1.3 mAh/g, leading to a capacity decay of a mere 0.001% per cycle.

Figure 12:
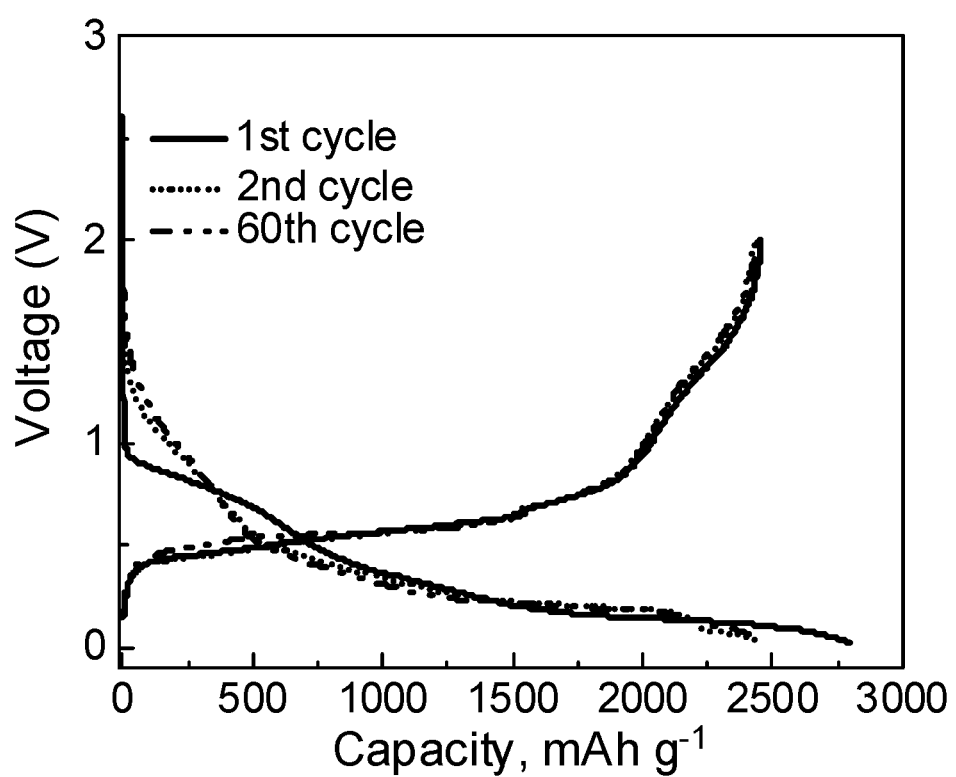
FIG. 12 is a graph of the charge/discharge curve of a $SbP_{37.2}$/carbon composite with 70 wt. % $SbP_{37.2}$ loading in the composite of Example 4 at C/3.
Figure 13:
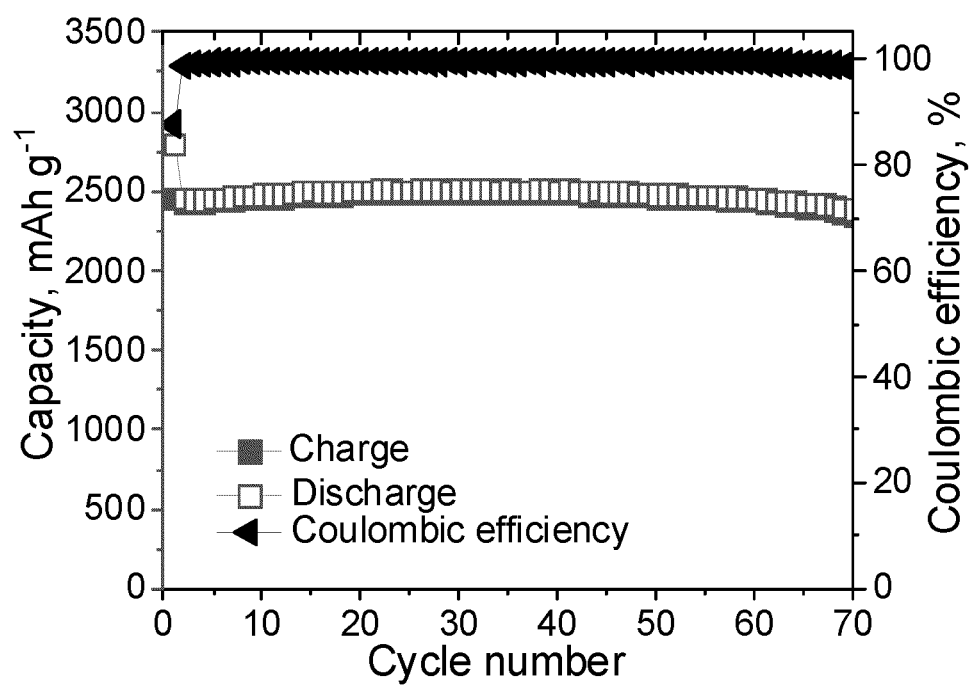
FIG. 13 is a graph of the charge/discharge curve of a $SbP_{37.2}$/carbon composite with 70 wt. % $SbP_{37.2}$ loading in the composite of Example 4 at C/3.

Example 12. Electrochemical properties of a battery including a $SbP_{37.2}$ (70 wt %)/Ketjenblack-MWCNTs Composite, prepared as in Example 8, but with the $SbP_{3.93}$ composite material instead. The charge/discharge profiles for a $SbP_{37.2}$ (70 wt %)/Ketjenblack-MWCNTs composite anode (according to Example 4) at C/3 are shown in FIG. 12. The initial discharge and charge capacity were determined to be 2801.3 mAh/g and 2456.1 mAh/g, respectively, resulting in a high, initial coulombic efficiency of about 88%, and a high utilization of 94.6%, compared to the theoretical capacity of phosphorus (2596 mAh/g). Such a high utilization of active material during charge/discharge $SbP_{37.2}$ (70 wt %)/Ketjenblack-MWCNTs demonstrates that the introduction of a small amount of Sb may enhance the electronic conduction, leading to greater reversible capacity. Upon continuous charge/discharge at C/3, the $SbP_{37.2}$ (70 wt %)/Ketjenblack-MWCNTs composite anode maintained its capacity for 70 cycles, indicating excellent cycle and capacity stability. The reversible capacity after 70 cycles was measured at 2356.3 mAh/g, corresponding to capacity retention as high as 96%, as shown in FIG. 13. The cycle stability of the $SbP_{37.2}$ (70 wt %)/Ketjenblack-MWCNTs composite clearly confirmed its highly reversible sodiation/de-sodiation during charge/discharge indicating that large volume changes have been suppressed using this approach.

Figure 14:
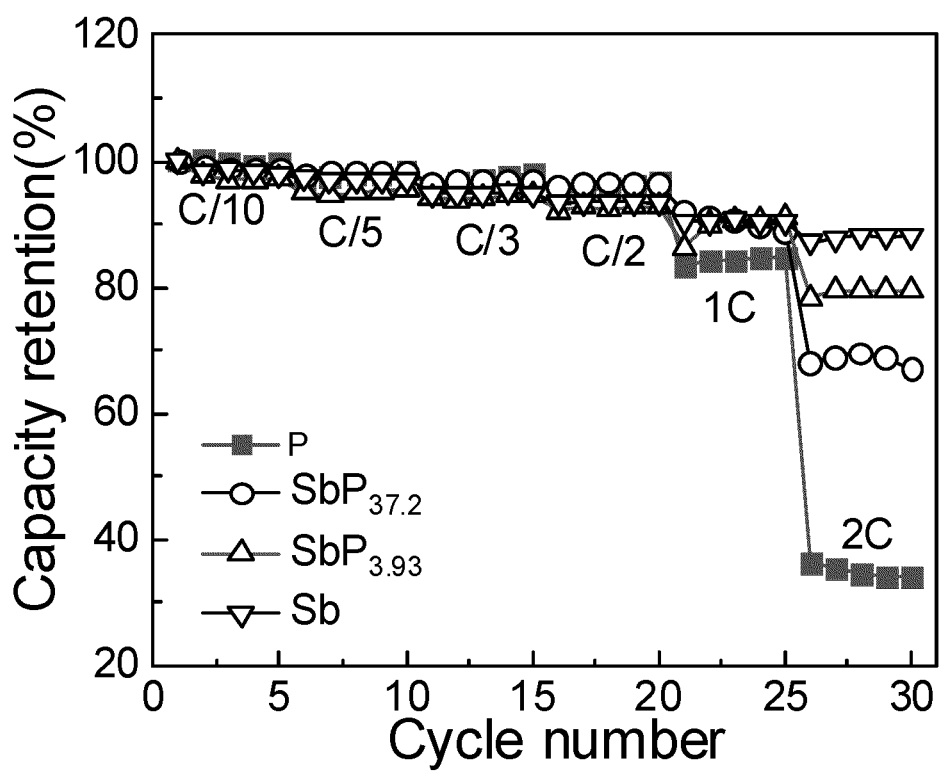
FIG. 14 is a graph of the rate performance of for a $[P_xSb_yM_z]_p/[carbon]_q$ composite, according to the examples.

Example 13. Rate performance of a $[P_xSb_yM_z]_p/[carbon]_q$ composite in a battery made using the procedure of Example 8, but with the $[P_xSb_yM_z]_p/[carbon]_q$ composite. In addition to the enhancement effect on the cycle stability, the improvement on the rate capability of the composite anode by incorporating Sb and other M is also confirmed. FIG. 14 illustrates the capacity retention of the $P_{3.93}Sb$ (70 wt %)/Ketjenblack-MWCNTs composite anode of Example 1, P (70 wt %)/Ketjenblack-MWCNTs composite anode of Example 2, Sb (70 wt %)/Ketjenblack-MWCNTs composite anode of Example 3 and $SbP_{37.2}$ (70 wt %)/Ketjenblack-MWCNTs composite of Example 4, at charge/discharge rate from C/10 to 2 C. As shown, due to the low electronic conductivity of red phosphorus, the material shows a dramatic decrease its reversible capacity during fast charging/discharging. Its average capacity at 2 C is only 40% of its capacity at C/10. However, due to the high electronic conductivity of Sb, at 2 C charge/discharge, it can still maintain 88% of its initial capacity at C/10. Therefore, when incorporating both Sb and P in the composite, the capacity retention at 2 C has been improved to 70% (Example 4) and 80% (Example 1). Such an enhancement effect on the capacity retention at fast charging is very important in the practical full cell as the capacity mismatch between cathode and anode will significantly affect the cycle stability. The anode/cathode capacity ratio of the full cell is usually controlled at from about 1 to 1.2. This means that if the capacity of the anode decreased substantially during fast charging, the capacity ratio will be reduced. Therefore, extra sodium from the cathode side will be deposited as sodium dendrite as anode, thereby significantly reducing the cycle life, and raising safety concerns. The composites provided herein, mitigate these issue.

Figure 15:
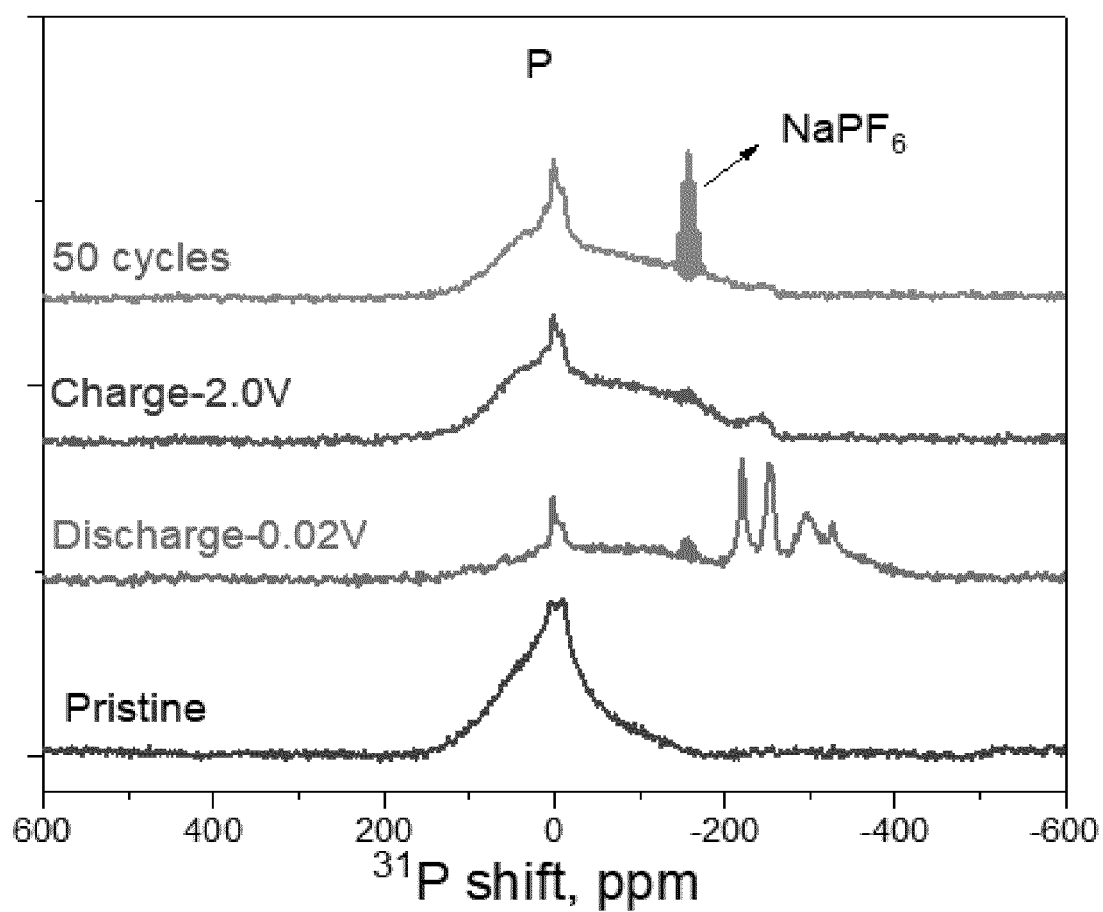
FIG. 15 includes $^{31}P$ NMR spectra of the P/C composite of Example 1 during cycling, according to the examples.

Example 14. $^{31}P$ Nuclear magnetic resonance (NMR) characterization to illustrate the reversible sodiation/desodiation of a $[P_xSb_yM_z]_p/[carbon]_q$ composite. To further illustrate the structures of sodiation/desodiation intermediates or products, particularly those in amorphous states, solid-state $^{31}P$ magic angle spinning (MAS) NMR spectroscopy was used. FIG. 15 shows the mass-normalized $^{31}P$ MAS NMR spectra of the P (70 wt %)/Ketjenblack-MWCNTs composite anode of Example 2 at different charge/discharge states. The pristine P (70 wt %)/Ketjenblack-MWCNTs anode shows one strong peak at δ=1 ppm, indicating an amorphous structure with a chemical shift and structure closer to that of red phosphorus. When the cell was discharged to 0.02 V, the signal for red phosphorus is clearly decreased, and several strong signals for $Na_3P$ appear. This indicates that most of the red phosphorus is converted to $Na_3P$. When the cell is charged back to 2.0 V, the strong signal of pristine red phosphorus is nearly completely recovered, and the strong $Na_3P$ signal disappears. After cycling at C/3 for 50 cycles, the composite maintains the amorphous phosphorus features, thereby confirming its highly reversible sodiation/de-sodiation.

While certain embodiments have been illustrated and described, it should be understood that changes and modifications can be made therein in accordance with ordinary skill in the art without departing from the technology in its broader aspects as defined in the following claims.

The embodiments, illustratively described herein may suitably be practiced in the absence of any element or elements, limitation or limitations, not specifically disclosed herein. Thus, for example, the terms "comprising," "including," "containing," etc. shall be read expansively and without limitation. Additionally, the terms and expressions employed herein have been used as terms of description and not of limitation, and there is no intention in the use of such terms and expressions of excluding any equivalents of the features shown and described or portions thereof, but it is recognized that various modifications are possible within the scope of the claimed technology. Additionally, the phrase "consisting essentially of" will be understood to include those elements specifically recited and those additional elements that do not materially affect the basic and novel characteristics of the claimed technology. The phrase "consisting of" excludes any element not specified.

The present disclosure is not to be limited in terms of the particular embodiments described in this application. Many modifications and variations can be made without departing from its spirit and scope, as will be apparent to those skilled in the art. Functionally equivalent methods and compositions within the scope of the disclosure, in addition to those enumerated herein, will be apparent to those skilled in the art from the foregoing descriptions. Such modifications and variations are intended to fall within the scope of the appended claims. The present disclosure is to be limited only by the terms of the appended claims, along with the full scope of equivalents to which such claims are entitled. It is to be understood that this disclosure is not limited to particular methods, reagents, compounds, compositions, or biological systems, which can of course vary. It is also to be understood that the terminology used herein is for the purpose of describing particular embodiments only, and is not intended to be limiting.

In addition, where features or aspects of the disclosure are described in terms of Markush groups, those skilled in the art will recognize that the disclosure is also thereby described in terms of any individual member or subgroup of members of the Markush group.

As will be understood by one skilled in the art, for any and all purposes, particularly in terms of providing a written description, all ranges disclosed herein also encompass any and all possible subranges and combinations of subranges thereof. Any listed range can be easily recognized as sufficiently describing and enabling the same range being broken down into at least equal halves, thirds, quarters, fifths, tenths, etc. As a non-limiting example, each range discussed herein can be readily broken down into a lower third, middle third and upper third, etc. As will also be understood by one skilled in the art all language such as "up to," "at least," "greater than," "less than," and the like, include the number recited and refer to ranges which can be subsequently broken down into subranges as discussed above. Finally, as will be understood by one skilled in the art, a range includes each individual member.

All publications, patent applications, issued patents, and other documents referred to in this specification are herein incorporated by reference as if each individual publication, patent application, issued patent, or other document was specifically and individually indicated to be incorporated by reference in its entirety. Definitions that are contained in text incorporated by reference are excluded to the extent that they contradict definitions in this disclosure.

Other embodiments are set forth in the following claims.

What is claimed is:

1. An anode active material comprising a $[P_xSb_yM_z]_p/[carbon]_q$ composite wherein:
   x, y, and z represent atomic percentage values and are x>0; y>0; and z≥0;
   M is an electrically conductive metal; and
   p and q represent the weight percentage values of the composite wherein p and q are in the range of 0-100%.

2. The anode active material of claim 1, wherein M comprises tin, germanium, lead, arsenic, selenium, bismuth, silicon, aluminum, nickel, manganese, molybdenum, niobium, tungsten, tantalum, iron, copper, titanium, vanadium, chromium, nickel, cobalt, zirconium, or yttrium.

3. The anode active material of claim 1, wherein M is selected from the group consisting of tin, germanium, lead, arsenic, selenium, bismuth, and a combination of any two or more thereof.

4. The anode active material of claim 1, wherein M is selected from the group consisting of tin, germanium, and a combination thereof.

5. The anode active material of claim 1, wherein M is tin.

6. The anode active material of claim 1, wherein z is 0.

7. The anode active material of claim 1, where x:y and x:z are greater than 10:1.

8. The anode active material of claim 1, wherein the $[P_xSb_yM_z]_p$ comprises a multi-phase microstructure comprising an amorphous or crystalline phase of P, an amorphous or crystalline phase of metal phosphide, an amorphous or nanocrystalline phase of a metal phosphide, and/or an amorphous or nanocrystalline phase of Sb or M.

9. The anode active material of claim 8, wherein the carbon comprises a first carbon phase comprising graphite, graphene, holey graphene, expanded graphite, reduced graphene oxide, acetylene black, Ketjenblack, carbon black, a metal-organic framework, porous carbon, carbon spheres, or carbon aerogel, carbon nanofiber; and a second carbon phase comprising single-walled carbon nanotubes, multi-walled carbon nanotubes, carbon nanofibers, carbon nanotube arrays, polypyrrole, or polyaniline, poly(3,4-ethylenedioxythiophene), poly(3,4-ethylenedioxythiophene), or polystyrene sulfonate.

10. The anode active material of claim 1, wherein the $[P_xSb_yM_z]_p/[carbon]_q$ composite has an average particle size from about 0.1 nm to 100 nm.

11. An electrochemical device comprising a cathode comprising a cathode active material and an anode comprising the anode active material of claim 1.

12. The electrochemical device of claim 11, wherein the cathode and/or anode further comprise a binder comprising sodium carboxymethylcellulose, sodium alginate, poly (acrylic acid), lithiated poly(acrylic acid), sodiated poly (acrylic acid), poly (vinyl alcohol), polyvinyl acetate, poly (ethylene imine), carboxymethyl chitosan, glutaradehyde, B-cyclodextrin polymer, Gum Arabic, PEDOT-PSS, polyacrylic latex, gelatin, polyamido amine, polyvinylidene fluoride, polytetrafluoroethylene, polyethylene, polystyrene, polyethylene oxide, polyimide, styrene butadiene rubber (SBR), polythiophene, polyacetylene, poly(9,9-dioctylfluorene-co-fluorenone), poly(9,9-dioctylfluorene-co-fluorenone-co-methylbenzoic ester), or a blend of any two or more binders.

13. The electrochemical device of claim 11 further comprising a separator disposed between the cathode and the anode.

14. The electrochemical device of claim 11 further comprising an electrolyte comprising a sodium salt and an aprotic solvent.

15. The electrochemical device of claim 11 which is a lithium ion, sodium ion, potassium ion, magnesium, or aluminum ion battery, or a lithium ion, sodium ion, potassium ion, magnesium, or aluminum ion capacitor.

16. A method of preparing a $[P_xSb_yM_z]_p/[carbon]_q$ composite, the method comprising:
   ball milling a mixture of P, Sb, M, and a conductive carbon a ratio to form the $[P_xSb_yM_z]_p/[carbon]_q$ composite; and
   recovering the $[P_xSb_yM_z]_p/[carbon]_q$ composite;
   wherein:
   x, y, and z represent atomic percentage values and are x>0; y>0; and z≥0;
   M is an electrically conductive metal; and
   p and q represent the weight percentage values of the composite with p+q=100 wt % and wherein is p>0 and 0≤q<100.

17. The method of claim 16, wherein M is tin, germanium, lead, arsenic, selenium, bismuth, aluminum, nickel, manganese, molybdenum, niobium, tungsten, tantalum, iron, copper, titanium, vanadium, chromium, nickel, cobalt, Zirconium, yttrium, or a combination of any two or more thereof.

18. The electrochemical device of claim 11 which is a potassium ion battery.

* * * * *